United States Patent [19]
Peyrot

[11] 3,757,076
[45] Sept. 4, 1973

[54] VACUUM CHAMBER WITH STATIC MOBILE SEALING JOINTS

[76] Inventor: Jean-Pierre Peyrot, 1, avenue de la Division du General Leclerc, Villejuif, Val-de-Marne, France

[22] Filed: Dec. 20, 1971

[21] Appl. No.: 209,648

[30] Foreign Application Priority Data
Dec. 21, 1970 France .............................. 7046061

[52] U.S. Cl. .......................................... 219/121 EB
[51] Int. Cl. ............................................ B23k 15/00
[58] Field of Search .............. 219/121 EB, 121 EM, 219/117 R, 69; 250/49.5 TE

[56] References Cited
UNITED STATES PATENTS
| | | | |
|---|---|---|---|
| 3,219,792 | 11/1965 | Pederson | 219/121 EM X |
| 3,136,882 | 6/1964 | Radtke | 219/117 R |
| 3,136,883 | 6/1964 | Radtke | 219/117 R X |
| 2,053,417 | 9/1936 | Brace | 219/72 |
| 1,749,765 | 3/1930 | Hendrickson | 219/74 |
| 2,883,544 | 4/1959 | Robinson | 219/69 C X |

Primary Examiner—J. V. Truhe
Assistant Examiner—Gale R. Peterson
Attorney—Karl W. Flocks

[57] ABSTRACT

Vacuum chamber for welding apparatus comprisng two bellows skirts coupled together by an upper collar on the top of an electron gun, the lower part of the skirts being located inside one of the others, and mobile continuous joints at the bottom of the skirts being at will alternatively pressed in a fluid tight manner in a static condition against a working table during the whole working operation where the gun walks along a welding line on the table.

3 Claims, 3 Drawing Figures

VACUUM CHAMBER WITH STATIC MOBILE SEALING JOINTS

The present invention relates to a vacuum chamber, and more particularly to a double chamber with bellows and sliding joints in order to obtain a high vacuum around the beam of radiation of an electron gun, for example during the execution of a linear weld.

Chambers with sliding joints arranged so as to permit the passage under vacuum of the electron bombardment beam of a welding gun are already known. However, the contacts of sliding joints are never as fluid-tight as the contacts of joints applied together in a continuous manner.

For this reason, the invention has provided round the electron beam, an inner chamber and an outer chamber, the bellows of which re-join each other at the level of the gun, the displacement of the beam of electrons being effected in a continuous manner, the frame which supports the gun being rigidly fixed to a first jack, the piston of which controls the displacement of the outer chamber, this outer chamber being rigidly fixed to a second jack, the piston of which controls the displacement of the joint of the inner chamber.

During the execution of the weld, the electron beam is always displaced inside the inner chamber; when this becomes necessary, the operation of the said second jack in a first stage displaces towards the front the joint of the inner chamber from one side to the other of the free space in the outer chamber, the fixed joint of the outer chamber ensuring the fluid-tightness in a perfect manner during this movement; in a second stage, the operation of the first jack displaces the joint of the outer chamber towards the front, the joint which is then stationary of the inner chamber ensuring perfect fluid-tightness during this movement in order to permit subsequently a further forward movement of the joint of the inner chamber and a new cycle of working.

Other characteristic features and advantages will become apparent from the description which follows below with reference to the accompanying drawings, which give, by way of indication and not in any limitative sense, one form of embodiment of the invention.

Figure 1:
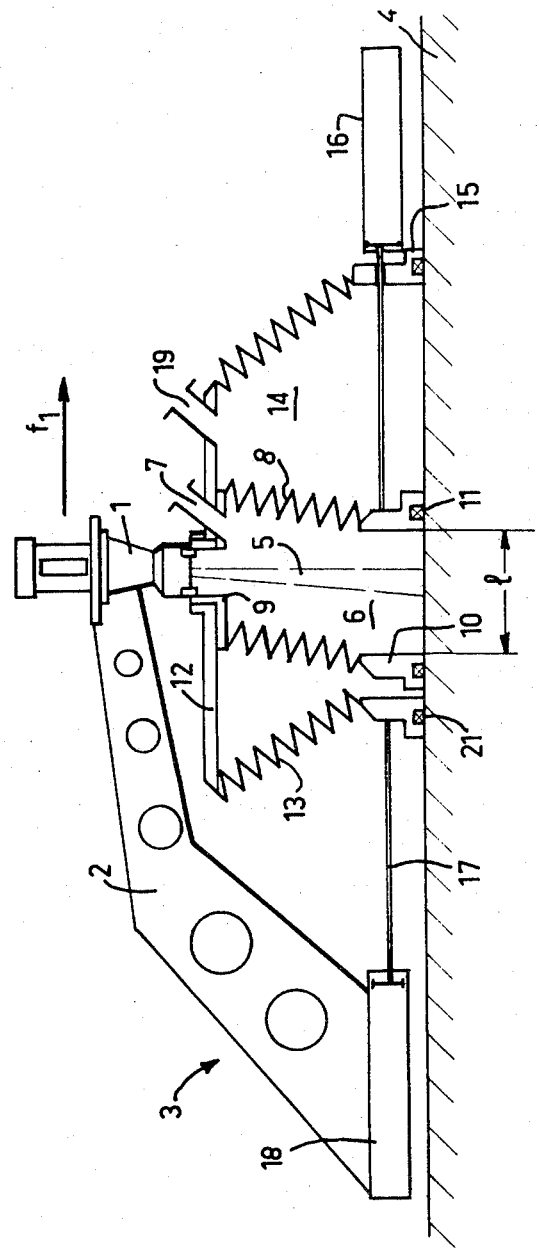
FIG. 1 is a view in elevation and in cross-section of a double vacuum chamber according to the invention.

There can be seen in FIG. 1 an electron gun 1 carried by the supporting arm 2 of a mobile assembly or frame indicated at 3, which is in this case mobile with respect to a working table 4 in order for example to carry out a linear weld in the plane of the drawing.

The electron beam 5 emitted by the gun 1 passes through a first vacuum chamber 6 which is pumped out in a conventional manner through the coupling 7.

According to the invention, the chamber 6 is delimited laterally by a bellows skirt 8 hermetically closed at its upper portion by a collar 9 and which is provided at its lower portion with a grooved sliding coupling 10 having a sealing joint 11, circular for example, applied against the table 4 around the position of the weld carried out by the electron bombardment beam 5.

The frame 3 rigidly fixed to the gun 1 is also rigidly coupled to a collar 12, closed in a contiguous manner on the collar 9 and at the periphery of which is attached in a fluid-tight manner, the bellows skirt 13 of a second vacuum chamber 14, larger than the chamber 6, which encloses the first chamber externally. Pumping through the coupling 19 effects a vacuum in the interior of the chamber 14.

The skirt 13 is edged at its lower part by a coupling 15 rigidly fixed on the one hand to a jack body 16 orientated in the direction of forward movement of the frame 3 and on the front of the said frame, and on the other hand, to the piston rod 17 of a jack body 18, the said jack body 18 being itself rigidly fixed to the moving assembly 3. The coupling 15 carries in a groove the sliding joint 21 applied in a fluid-tight manner against the table 4.

Figure 2:
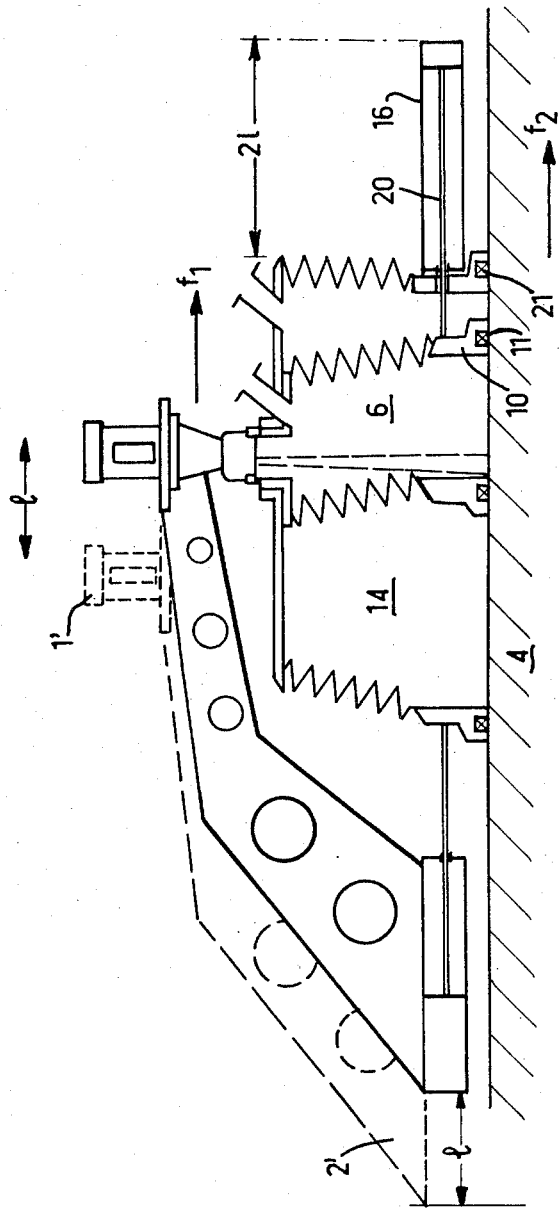
FIG. 2 is a view similar to that of FIG. 1 in a second stage of operation.

It can be seen that when the assembly 3 moves the gun 1 in the direction of the arrow $f_1$ on its welding path, the beam 5 first passes through the free space $l$ in the interior of the first chamber 6 following the course (1', 2') to (1',2) shown in FIG. 2.

In order to permit the beam 5 to continue its path along the welding zone in the interior of the vacuum chamber 6, the invention provides, as shown in FIG. 2, that the rod 20 of the jack 16, coupled to the sliding joint 11 by means of the coupling 10, can be actuated in the direction of the arrow $f_2$, substantially parallel to $f_1$ over a distance equal, for example, to 2 $l$. The gun 1 has therefore again available a free space having a length $l$ in the interior of the chamber 6, in the direction of its movement shown by the arrow $f_1$.

Figure 3:
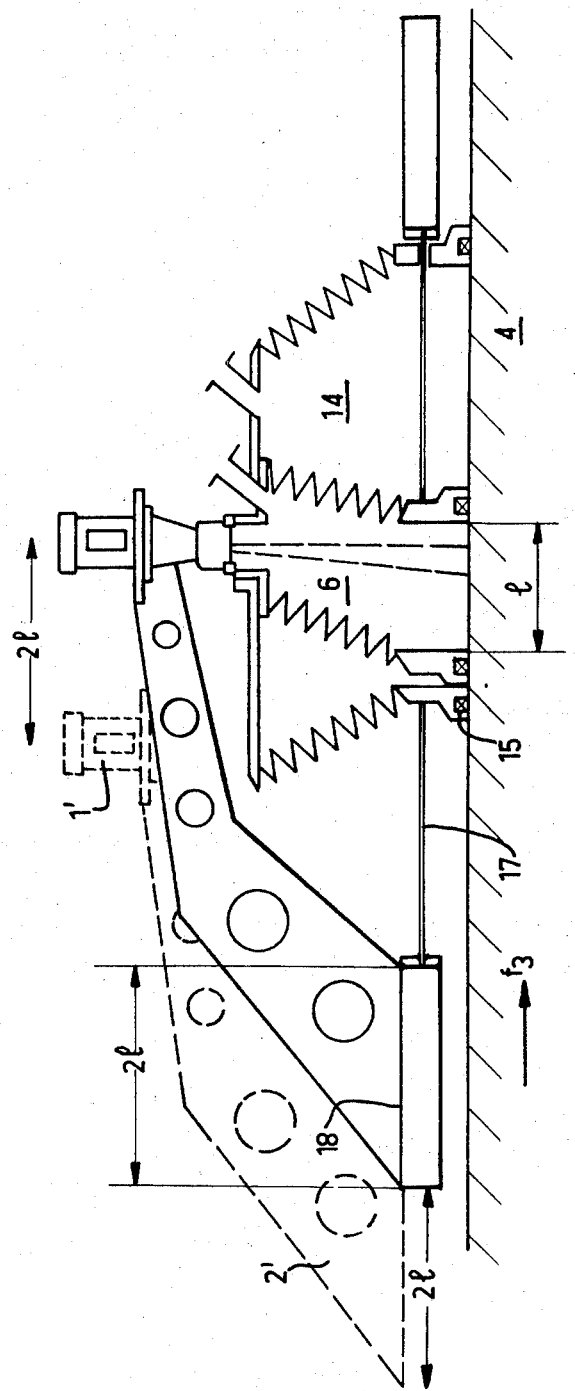
FIG. 3 is a view similar to that of FIG. 2 in a third stage of operation.

However, in order to permit subsequently a further forward movement of the coupling 10 which delimits the chamber 6, the invention provides that the rod 17 may be actuated over a distance 2 $l$ for example, in the interior of the jack body 18 (see FIG. 3) in the direction of the arrow $f_3$ substantially parallel to the direction of the arrow $f_2$, this movement transferring the coupling 15 of the chamber 14 ahead of the future path of the gun 1 and of the inner chamber 6.

It can be seen that the step-by-step displacement by successive jumps of the sliding joint 11 and 21 is effected in an alternate manner during the continuous displacement of the gun 1. In consequence, there is always a joint 11 applied in a stationary manner while the other joint 21 is moved and vice-versa. This is very advantageous for the maintenance of a high vacuum in the interior of the chamber 6, isolated from the atmosphere by the intermediate outer chamber 14.

In particular, it will be understood that the means for displacing the two skirts, described in this case in the form of jacks, may be chosen in the form of toothed racks, Archimedean screws or like devices.

Similarly, the joints which are alternately static and mobile may be displaced by sliding, lifting or similar movements.

Finally, the gun and its double chamber may be coupled to the fixed frame of an active machine with respect to which the work-table is moved.

It will further be understood that the present invention has been described above by way of indication of a preferred example, but is in no way limitative, and that any equivalence may be introduced into its constituent part without thereby departing from its scope as defined in the appended claims.

I claim:

1. A double vacuum chamber with mobile joints comprising a frame movable with respect to a worktable,
at least one first chamber inside a second chamber,
an electron gun carried by said frame,
said chambers hermetically coupled to said electron gun,
said first chamber including
- an upper collar hermetically coupled to said electron gun,
- a bellows type skirt connected to said upper collar,
- a first continuous coupling attached at the bottom of said skirt,
- a sliding joint at the lower part of said first coupling, said second chamber including
- an upper collar hermetically coupled to said collar of said first chamber,
- a bellows type skirt connected to said upper collar of said second chamber,
- a second continuous coupling attached at the bottom of said skirt of said second chamber,
- a sliding joint at the lower portion of said second coupling, a first hydraulic jack rigidly fixed to said frame,
a first piston rod sliding in said first hydraulic jack,
a second hydraulic jack located at 180° from said first rod,
a second piston rod sliding in said second hydraulic jack,
said second coupling being rigidly fixed on the one hand to said first piston rod and on the other hand to said second hydraulic jack,
said second piston rod being connected to said first coupling,
said couplings and said joints closing said chambers against said worktable on which the work is effected,
at least one of said joints connected to said two chambers being alternately pressed in a fluid-tight manner in a static condition against said worktable during all the working operations during which said jacks and pistons operate successively.

2. A double vacuum chamber in accordance with claim 1, further characterized by
said rods slidable in their respective said jacks for a distance which is twice the free space inside said first coupling in the direction of movement of said frame.

3. A double vacuum chamber in accordance with claim 2, further characterized by
the displacement of an electron beam which is propagated in the interior of said first chamber between said gun and said worktable on which welding is effected in a continuous manner,
said first jack displacing said second coupling in a first jump ahead of the path of the electron beam on the outside of said first coupling during a first stage,
said second jack displacing said first coupling by a second jump ahead of the path of the electron beam inside said second coupling during a second stage,
at least one of said joints applied in a static manner against said worktable during the relative movement of the other said joint thereby ensuring the fluid tightness of said double chamber at every instant.

* * * * *